(12) United States Patent
Kerschbaum

(10) Patent No.: US 9,111,071 B2
(45) Date of Patent: Aug. 18, 2015

(54) EXPRESSION REWRITING FOR SECURE COMPUTATION OPTIMIZATION

(71) Applicant: Florian Kerschbaum, Karlsruhe (DE)

(72) Inventor: Florian Kerschbaum, Karlsruhe (DE)

(73) Assignee: SAP SE, Walldorf (DE)

( * ) Notice: Subject to any disclaimer, the term of this patent is extended or adjusted under 35 U.S.C. 154(b) by 75 days.

(21) Appl. No.: 13/668,472

(22) Filed: Nov. 5, 2012

(65) Prior Publication Data

US 2014/0130173 A1 May 8, 2014

(51) Int. Cl.
*G06F 7/04* (2006.01)
*G06F 21/12* (2013.01)
*G06F 21/10* (2013.01)
*G11B 20/00* (2006.01)

(52) U.S. Cl.
CPC .............. *G06F 21/125* (2013.01); *G06F 21/10* (2013.01); *G11B 20/0021* (2013.01); *G11B 20/00086* (2013.01)

(58) Field of Classification Search
CPC . G06F 21/10; G06F 21/125; G11B 20/00086; G11B 20/0021
USPC ............................................. 726/26; 713/187
See application file for complete search history.

(56) References Cited

U.S. PATENT DOCUMENTS

| | | | | |
|---|---|---|---|---|
| 5,027,292 A | * | 6/1991 | Rossignac et al. | 345/422 |
| 6,745,384 B1 | * | 6/2004 | Biggerstaff | 717/156 |
| 6,978,271 B1 | * | 12/2005 | Hoffman et al. | 1/1 |
| 8,713,064 B1 | * | 4/2014 | Khafizov et al. | 707/797 |
| 2008/0046865 A1 | * | 2/2008 | Kerschbaum | 717/106 |
| 2008/0097716 A1 | * | 4/2008 | Stark | 702/119 |
| 2009/0307673 A1 | * | 12/2009 | Eichenberger et al. | 717/160 |
| 2010/0199257 A1 | * | 8/2010 | Biggerstaff | 717/104 |

OTHER PUBLICATIONS

Pilone, Tracey and Pilone, Dan, "Head First Algebra", 2009, O'Reily Media, Inc., pp. 78 and 105.*
Kerschbaum, Expression Rewriting for Secure Computation Optimization, SAP Research, 2013, 10 pages.
J. B. Almeida et al., A Certifying Compiler for Zero-Knowledge Proofs of Knowledge Based on $\Sigma$--Protocols, ESORICS'10, Proceedings of the 15th European Conference on Research in Computer Security, 2010, 17 pages.

(Continued)

*Primary Examiner* — Eleni Shiferaw
*Assistant Examiner* — Gregory M Elmore
(74) *Attorney, Agent, or Firm* — Fish & Richardson P.C.

(57) ABSTRACT

Implementations of the present disclosure are directed to provide secure, multi-party computation and include actions of receiving a program, the program being human-readable and including one or more expressions to provide secure computation based on inputs provided by two or more parties, the program providing a secure computation protocol including at least one calculation that is performed on behalf of the two or more parties, processing the program and one or more rewriting rules in view of a cost-driven heuristic to automatically generate a rewritten program, the rewritten program including a structure that enables localization of one or more calculations and providing an optimized secure computation protocol that localizes the at least one calculation to be performed by at least one of the two or more parties, and compiling the rewritten program to generate a computer-executable program.

15 Claims, 9 Drawing Sheets

(56) References Cited

OTHER PUBLICATIONS

Backes et al., Automated Synthesis of Privacy-Preserving Distributed Applications, NDSS'12: Proceedings of the 19th Annual Network and Distributed System Security Symposium, 2012, 16 pages.
A. Banerjee, A joint economic lot-size model for purchaser and vendor, Decision Sciences, 17(3), 1986, 1 page.
D. Beaver et al., The Round Complexity of Secure Protocols, In STOC'90: Proceedings of the 22nd ACM Symposium on Theory of Computing, 1990, 11 pages.
A. Ben-David, Fairplaymp—A System for Secure Multi-Party Computation, In CCS'08: Proceedings of the 15th ACM Conference on Computer and Communications Security, 2008, 10 pages.
M. Ben-Or, Completeness Theorems for Non-Cryptographic Fault-Tolerant Distributed Computation, In STOC'88: Proceedings of the 20th ACM Symposium on Theory of Computing, 1988, 10 pages.
D. Bogdanov et al., Sharemind: a framework for fast privacy preserving computations, In ESORICS'08: Proceedings of the 13th European Symposium on Research in Computer Security, 2008, 15 pages.
D. Bogdanov et al., Deploying secure multi-party computation for financial data analysis, In FC'12: Proceedings of the 16th International Conference on Financial Cryptography and Data Security, 2012, 8 pages.
P. Bogetoft et al., Secure Multiparty Computation Goes Live, In FC'09: Proceedings of the 13th International Conference on Financial Cryptography and Data Security, 2009, 13 pages.
O. Catrina et al., Secure Computation With Fixed-Point Numbers, In FC'10: Proceedings of the 14th International Conference on Financial Cryptography and Data Security, 2010, 16 pages.
J. Cocke, Global Common Subexpression Elimination, SIGPLAN Notices, Jul. 1970, 5 pages.
R. Cramer et al., General Secure Multi-Party Computation from any Linear Secret-Sharing Scheme, In EUROCRYPT'00: Proceedings of the 19th European Cryptology Conference, 2000, 19 pages.
R. Cramer et al., Proofs of Partial Knowledge and Simplified Design of Witness Hiding Protocols, In CRYPTO '94: Proceedings of the 14th International Cryptology Conference, 1994, 14 pages.
I. Damgård et al., Asynchronous Multiparty Computation: Theory and Implementation, In PKC'09: Proceedings of the 12th International Conference on Practice and Theory in Public Key Cryptography, 2009, 20 pages.
L. Devroye, Branching Processes in the Analysis of the Heights of Trees, Acta Informatica, 24, 1987, pp. 27-298.
O. Goldreich, Foundations of Cryptography, vol. II, Cambridge University Press, 2004, 449 pages.
S. Goldwasser, Multi-Party Computations: Past and Present, In PODC'97: Proceedings of the 16th ACM Symposium on Principles of Distributed Computing, 1997, 6 pages.
J. Groth et al, Efficient Non-Interactive Proof Systems for Bilinear Groups, In EUROCRYPT'08: Proceedings of the 27th European Cryptology Conference, 2008, pp. 415-432.
W. Henecka et al., TASTY: Tool for Automating Secure Two-partY computations, In CCS'10: Proceedings of the 17th ACM Conference on Computer and Communications Security, 2010.
Y. Huang et al., Faster Secure Two-Party Computation Using Garbled Circuits, In Proceedings of the 20th USENIX Security Symposium, 2011, 16 pages.
R. Jagomägis, SecreC: a Privacy-Aware Programming Language with Applications in Data Mining, Master's Thesis (30 EAP), University of Tartu, 2010, 49 pages.
M. Jensen et al. Towards Privacy-Preserving XML Transformation, In ICWS'11: Proceedings of the 9th IEEE International Conference on Web Services, 2011, pp. 65-72.
F. Kerschbaum, Automatically Optimizing Secure Computation, In CCS'11: Proceedings of the 18th ACM Conference on Computer and Communications Security, 2011, 11 pages.
F. Kerschbaum, An Information-Flow Type-System for Mixed Protocol Secure Computation, SAP Applied Research, 2012, 12 pages.
F. Kerschbaum et al., On the Practical Importance of Communication Complexity for Secure Multi-Party Computation Protocols, In SAC'09: Proceedings of the 24th ACM Symposium on Applied Computing, 2009, 8 pages.
F. Kerschbaum et al,.Secure Collaborative Supply Chain Management, IEEE Computer, 44(9), 2011, pp. 38 43.
V. Kolesnikov et al., From Dust to Dawn: Practically Efficient Two-Party Secure Function Evaluation Protocols and their Modular Design, Cryptology ePrint Archive: Report 2010/079, 2010, 2 pages.
V. Kolesnikov et al., Improved Garbled Circuit: Free XOR Gates and Applications, In ICALP'08: Proceedings of the 35th International Colloquium on Automata, Languages and Programming, Part II, 2008, 12 pages.
Y. Lindell et al., A Proof of Security of Yao's Protocol for Two-Party Computation, Journal of Cryptology, 22(2), Jun. 26, 2006, 25 pages.
D. Malkhi et al., Fairplay—A Secure Two-Party Computation System, In Proceedings of the 13th USENIX Security Symposium, Feb. 1, 2004, 20 pages.
S. Meiklejohn et al., ZKPDL: A Language-Based System for Efficient Zero-Knowledge Proofs and Electronic Cash, In Proceedings of the 19th USENIX Security Symposium, 2010.
J. D. Nielsen et al., A Domain-Specific Programming Language for Secure Multiparty Computation, In PLAS'07: Proceedings of the ACM Workshop on Programming Languages and Analysis for Security, Jun. 14, 2007, pp. 21-30.
J. A. Painter, Effectiveness of an Optimizing Compiler for Arithmetic Expressions, SIGPLAN Notices, Jul. 1970, 26 pages.
R. Pibernik et al., Secure collaborative supply chain planning and inverse optimization—the JELS model. European Journal of Operational Research, 208(1), 2011, pp. 75-85.
A. Schröpfer et al., Demo: Secure Computation in Javascript, In CCS'11: Proceedings of the 18th ACM Conference on Computer and Communications Security, 2011, 3 pages.
A. Schröpfer et al., L1—An Intermediate Language for Mixed-Protocol Secure Computation, In COMPSAC'11: Proceedings of the 35th, IEEE Computer Software and Applications Conference, Jul. 2011, pp. 298-307.
A. Schröpfer et al, Forecasting Run-Times of Secure Two-Party Computation, In QEST'11: Proceedings of the 8th International Conference on Quantitative Evaluation of Systems, 2011, 10 pages.
A. C. Yao, Protocols for Secure Computations, In FOCS'82: Proceedings of the 23rd IEEE Symposium on Foundations of Computer Science, 1982, pp. 160-164.

\* cited by examiner

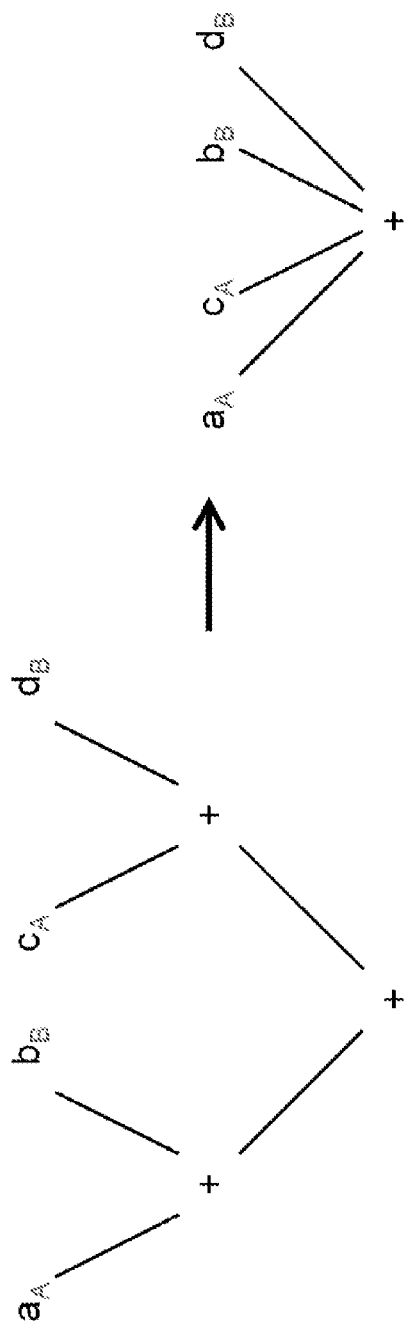
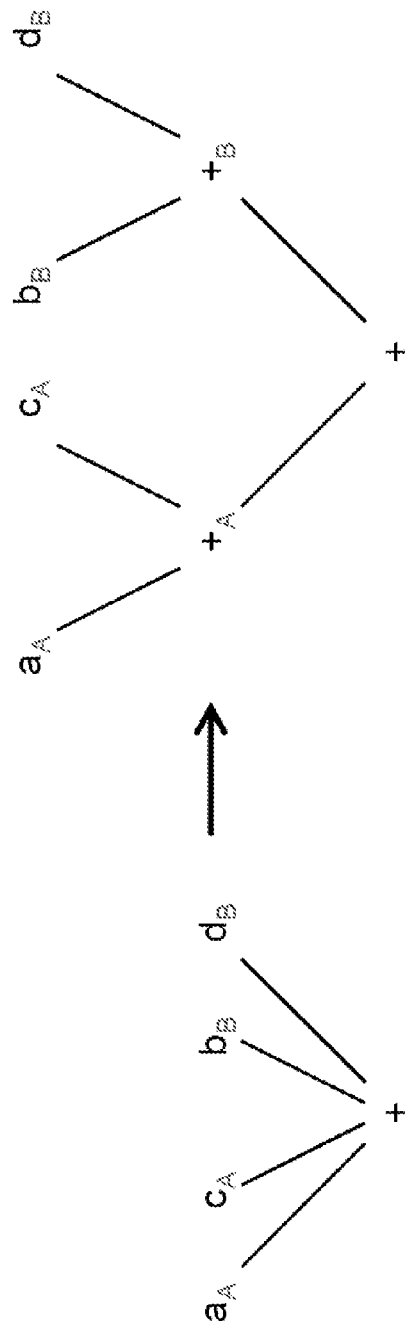
FIG. 3A
FIG. 3B

EXPRESSION REWRITING FOR SECURE COMPUTATION OPTIMIZATION

BACKGROUND

Secure multi-party computation enables parties to compute a function over their joint, respective inputs, which are provided as private inputs. That is, a party's input is confidential to the other parties. No party can infer anything about another party's input except what can be inferred from one's own input and/or output.

Secure computation has many applications and has been successfully deployed in commercial and industrial settings. Secure computations, however, notoriously suffer from poor performance as compared to non-secure computations. In an effort to address such deficiencies, manual optimization in the form of manual optimized protocols, has been proffered as a solution. Manual optimization, however, has limitations (e.g., difficult to scale). In view of this, compilers and programming environments that intend to remedy these problems have been developed. Nevertheless, such solutions can still suffer from worse performance than manual optimized protocols.

SUMMARY

Implementations of the present disclosure include methods for providing secure, multi-party computation. In some implementations, methods include actions of receiving a program, the program being human-readable and including one or more expressions to provide secure computation based on inputs provided by two or more parties, the program providing a secure computation protocol including at least one calculation that is performed on behalf of the two or more parties, processing the program and one or more rewriting rules in view of a cost-driven heuristic to automatically generate a rewritten program, the rewritten program including a structure that enables localization of one or more calculations and providing an optimized secure computation protocol that localizes the at least one calculation to be performed by at least one of the two or more parties, and compiling the rewritten program to generate a computer-executable program.

In some implementations, processing the program and one or more rewriting rules includes representing an expression of the program as an abstract syntax tree, the abstract syntax tree including nodes representing one or more operators of the expression and leaves representing simple expressions of the expression, a root node of the abstract syntax tree comprising a final operator that is to be evaluated based on the expression.

In some implementations, the abstract syntax tree is provided based on applying operator precedence rules to the expression.

In some implementations, processing the program and one or more rewriting rules further includes: assigning labels to one or more leaves of the abstract syntax tree, and assigning labels to one or more nodes of the abstract syntax tree, each label reflecting an origin that includes at least one or the two or more parties.

In some implementations, assigning labels includes applying one or more inference rules.

In some implementations, a non-labeled leaf includes a simple expression having a value that is to remain unknown to the two or more parties.

In some implementations, at least one parent node is assigned a label including an intersection of labels of children nodes.

In some implementations, processing the program and one or more rewriting rules includes rewriting the abstract syntax tree based on the one or more rewriting rules to provide a rewritten abstract syntax tree, the rewritten abstract syntax tree representing a rewritten expression based on the expression.

In some implementations, the one or more rewriting rules include at least one rewriting rule from a group including: an associative law rewriting rule, a commutative law rewriting rule, a distributive law rewriting rule, an inverse balancing rewriting rule.

In some implementations, the cost-driven heuristic is applied to determine a cost of an expression and a cost of a rewritten expression, the rewritten expression being based on the expression.

In some implementations, the rewritten expression replaces the expression when the cost of the expression is greater than the cost of the rewritten expression.

In some implementations, the optimized secure computation protocol emulates a trusted party which receives the inputs from the two or more parties, computes a function, and privately provides a respective output to each party of the two or more parties.

In some implementations, the program requires a number of cryptographic steps, and the rewritten program reduces the number of cryptographic steps.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

FIGS. 3A and 3B depict an example application of an example associative law rewriting rule and an example commutative law rewriting rule.

Like reference symbols in the various drawings indicate like elements.

DETAILED DESCRIPTION

In an effort to remedy above-described deficiencies, an automatic compiler optimization for secure computations can be provided, which is capable of transforming a program (e.g., a FairPlay program) into a secure computation protocol that is as efficient as a manually optimized protocol. Nevertheless, this optimization relies on the structure of the program, such that the programmer has to adapt the program in order to yield the optimal performance. This can be a very complicated task, because the optimization might not be obvious to the programmer. The optimizer may fail to provide an efficient protocol. In some examples, the optimizer can be included with a compiler, where input and output of the compiler is code provided in the intermediate language of the compiler and the output is expected to be more efficient.

In view of this, implementations of the present disclosure are generally directed to restructuring a secure computation program such that the program is amenable to optimization. That is, the restructured program can be optimized more efficiently than the original program (the program before being restructured). In some implementations, restructuring the program includes rewriting expressions, such that the optimizer will output a more efficient secure computation protocol. In some examples, a plurality of expression rewriting rules is provided, the rewriting rules being designed to yield more efficient secure computation protocols. In some implementations, a cost-driven heuristic is used. In some examples, the cost-driven heuristic is applied to the expression rewriting rules, such that the resulting protocol (provided in the restructured program) is at least as efficient as the protocol compiled from the original program.

Figure 1:
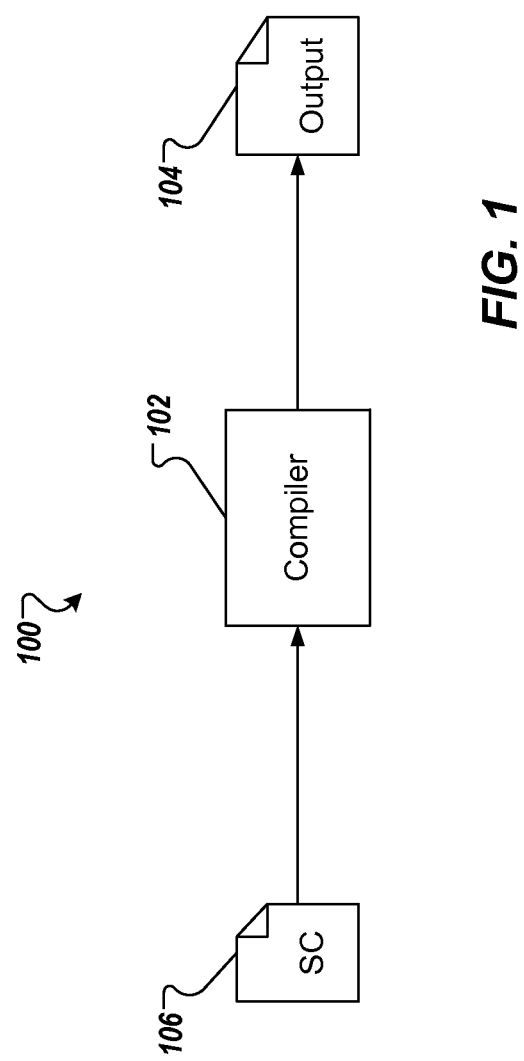
FIG. 1 depicts example compilation in accordance with implementations of the present disclosure.

FIG. 1 depicts example compilation 100 in accordance with implementations of the present disclosure. More particularly, FIG. 1 depicts an example compiler 102 for generating an output 104 from human-readable source code (SC) 106 in accordance with implementations of the present disclosure. The example compiler 102 transforms the source code 106 into the output 104. In some examples, the compiler 102 is provided as one or more computer-executable programs that can be executed using one or more computing devices. In some examples, the source code 106 is provided as a computer-readable document that can be processed by the compiler 102. In some examples, the source code 106 is provided in a human-readable (human-writable) programming language. In some examples, the output 104 is provided as a computer-readable document that can be executed by one or more computing devices to provide defined functionality (e.g., secure computation). In some examples, the output 104 is provided in a machine-readable format (e.g., object code) to define a computer-executable program.

In accordance with implementations of the present disclosure, the source code 106 can provide a secure computation program including one or more expressions to provide secure computation based on inputs provided by two or more parties. In some examples, the program provides a secure computation protocol including at least one calculation that is performed on behalf of the two or more parties. As discussed in further detail herein, the source code 106 (i.e., the program) and one or more rewriting rules can be processed in view of a cost-driven heuristic to automatically generate a rewritten program. In some examples, the rewritten program includes a structure that enables localization of one or more calculations. In some examples, the compiler 102 can perform the processing. In some examples, an optimizer (included within or separate from the compiler 102) can perform the processing. In some example, the rewritten program provides an optimized secure computation protocol that localizes the at least one calculation to be performed by at least one of the two or more parties. The compiler 102 can compile the rewritten program to generate the output 104 as the computer-executable program.

Before discussing implementations of the present disclosure in further detail, an example problem will be introduced to provide context. It is appreciated, however, that implementations of the present disclosure can be applied for other problems. The example problem can include an example secure computation that is to be performed between two parties, Alice and Bob. In the example problem, Alice and Bob each have n data values identified as $a_i$ and $b_i$, respectively, where $0 \le i < n$. Alice and Bob want to compute the mean $\mu$ and the variance $\sigma^2$ of the joint 2n values. The following example formulae can be provided:

$$\mu = \frac{1}{2n} \sum_{i=0}^{n-1} (a_i + b_i)$$

$$\sigma^2 = \frac{1}{2n-1} \sum_{i=0}^{n-1} ((a_i - \mu)^2 + (b_i - \mu)^2)$$

In a single instance of a secure computation protocol (e.g., using Yao's garbled circuit protocol), the protocol would have 2n inputs and 2 outputs. Using a compiler (e.g., a FairPlay compiler), the above formulas can be straightforwardly implemented. In this example problem, the input size n is known to both parties. Nevertheless, this secure computation protocol is not optimal.

An optimized secure computation protocol can be provided. For example, and continuing with the example problem, Alice and Bob each locally add their values to an intermediate sum a and b, respectively. Next, Alice and Bob exchange the intermediate sums and compute the mean locally as, for example:

$$\mu = \frac{a+b}{2n}$$

Because Alice and Bob, each know the mean, Alice and Bob can each locally sum the square of the differences of their values to provide intermediate sums a' and b', respectively. Next, Alice and Bob can exchange the intermediate sums and locally compute the variance as, for example:

$$\sigma^2 = \frac{a'+b'}{2n-1}$$

In some examples, the optimized secure computation protocol can be implemented in other languages for secure computation (e.g., the L1 language). The optimized secure computation protocol is orders of magnitude faster, and does not use, for example, any cryptographic operations (e.g., encryption or oblivious transfer). Furthermore, the optimized secure computation protocol reduces the complexity of the secure computation from $O(n^2)$ (computing 2n squares for the variance) to $O(1)$ (exchanging two values). This significant performance gain can be attributed to localizing most of the computation.

By way of example, a program for secure computation of statistics based on input from multiple parties can be considered. The following example listing provides an example of such a program:

---
Listing 1.1: Example Program for Statistics Computation
---
```
program Statistics {
  const n           = 20;
  type Elem         = Int <32>;
  type AliceInput   = Elem [n];
  type AliceOutput  = struct {   Elem         mean,
                                 Elem         var};
  type BobInput     = Elem [n];
  type BobOutput    = struct {   Elem         mean,
                                 Elem         var };
  type Input        = struct {   AliceInput   alice,
                                 BobInput     bob };
  type Output       = struct {   AliceOutput  alice,
                                 BobOutput    bob };
  function Output main (Input in) {
    var mean , var;
    mean = 0;
    for (i = 0 to n-1) {
        mean = mean + in.alice [i] + in.bob [i];
    }
    mean = mean / (2 * n);
    var = 0;
    for (i = 0 to n-1) {
        var = var + (in.alice [i] - mean) * (in.alice [i] -
            mean) + (in.bob [i] - mean) * (in.bob [i] -
            mean);
    }
    var = var / (2 * n - 1);
    main.alice.mean = mean;
    main.alice.var = var;
    main.bob.mean = mean;
    main.bob.var = var;
  }
}
```

In accordance with implementations of the present disclosure, discussed in further detail herein, the example program of Listing 1.1 can be rewritten to provide the following example rewritten program:

---
Listing 1.2: Example Rewritten Program for Statistics Computation
---
```
program Statistics {
  const n           = 20;
  type Elem         = Int <32>;
  type AliceInput   = Elem [n];
  type AliceOutput  = struct {   Elem         mean,
                                 Elem         var};
  type BobInput     = Elem [n];
  type BobOutput    = struct {   Elem         mean,
                                 Elem         var };
  type Input        = struct {   AliceInput   alice,
                                 BobInput     bob };
  type Output       = struct {   AliceOutput  alice,
                                 BobOutput    bob };
  function Output main (Input in) {
    var meana, meanb, mean, vara, varb, var;
    meana = 0;
    for (i = 0 to n-1) {
```

---
Listing 1.2: Example Rewritten Program for Statistics Computation
---
```
        meana = meana + in.alice [i];
    }
    meanb = 0;
    for (i = 0 to n-1) {
        meanb = meanb + in.bob [i];
    }
    mean = (meana + meanb) / (2 * n);
    vara = 0;
    for (i = 0 to n-1) {
        vara = vara + (in.alice [i] - mean) * (in.alice [i] -
            mean);
    }
    varb = 0;
    for (i = 0 to n-1) {
        varb = varb + (in.bob [i] - mean) * (in.bob [i] -
            mean);
    }
    var = (vara + varb) / (2 * n - 1);
    main.alice.mean = mean;
    main.alice.var = var;
    main.bob.mean = mean;
    main.bob.var = var;
  }
}
```

Although algorithms that can automatically infer parts of the program that can be locally computed are available, such algorithms can fail when used with particular code. For example, such algorithms can rely on the structure of the program and, because the programmer might not have foreseen localizing the sums, for example, the optimizer is unable to detect such localization. Consequently, the program should be rewritten, such that the optimizer can be effective. For example, and with continued reference to the example problem, the program should be rewritten such that values from either Alice or Bob are first summed within their respective sets. The optimizer would successfully deduce the efficient protocol from the rewritten program.

Implementations of the present disclosure are directed to automatically rewriting a program in view of one or more rewriting rules to provide a rewritten program. In some examples, the program, when compiled, provides functionality for a secure computation protocol. In some examples, the rewritten program can be compiled to provide an optimized secure computation protocol that is more efficient than the secure computation protocol that would have been provided from the program. Implementations of the present disclosure are generic and can be used with various secure computation protocols.

As noted above, secure computation can include computing one or more outputs based on inputs provided from one or more parties. In some examples, everything that can be inferred from one's input and output is known. All known information can be revealed during the computation and does not have to be computed securely. In some examples, and using logic inference, the knowledge of each party with respect to a program's variables can be inferred. In some examples, and as discussed in further detail herein, each simple expression (e.g., constant or variable) in the program can be assigned a label. In some examples, labels are non-exclusive. That is, a simple expression can be assigned none, one or multiple labels. In some examples, and as discussed in further detail herein, a variable without a label is secret and can only be implemented using secure computation, while a variable with multiple labels is public or semi-public information and can be shared. In some implementations, one or more inference rules can be used to assign labels. In some examples, forward inference rules try to infer knowledge about the result of an expression from knowledge about input(s) to the expression. In some examples, backward inference rules try to infer knowledge about the input(s) of an expression from knowledge about a result of the expression.

In some implementations, program variables that can be learnt from input and/or output are inferred using inference rules. In some examples, and as introduced above, each variable (whether input, output or intermediary) that is known to a party carries a label. For example, if a variable is known only to Alice, the variable carries the label A, if the variable is known only to Bob, the variable carries the label B, and if the variable is known to Alice and Bob, the variable carries the label AB. In some examples, labels of variables can be inferred using epistemic modal logic. For example, the following example statement can be considered:

$$a+b=c$$

If the variables b and c are known, the variable a is also known. This can be referred to as forward inference. If the variables a and b are known, the variable c could be known depending on the operator (e.g., + in the example). This can be referred to as backward inference.

In some implementations, the optimizer transforms the program into an intermediate language before applying the inference rules. In some examples, the intermediate language is a loop-free, single static assignment, three-operand code. In some examples, if all three operands are known to at least one party, a statement can be performed locally by the party and does not need to be computed in the secure computation protocol.

In some implementations, the optimizer segments the program into a plurality of secure computation protocols and local programs. Only the statements that are to be performed securely are implemented in a secure computation protocol. In some examples, local segments at the beginning and at the end can be commonly exploited. Implementations of the present disclosure enable this segmentation even, if the program description as such does not. In this manner, optimization is extended by rewriting rules that transform the program into a better, optimizable program.

Implementations of the present disclosure further address security. In some implementations, a semi-honest model or an honest-but-curious model can be assumed. In some examples, an adversary in the semi-honest model is assumed to follow the protocol as prescribed, but may keep a record of the interaction and try to infer as much information as possible. A protocol that is secure in the semi-honest model ensures that such an adversary learns nothing except what can be inferred from its input and output. In some examples, this guarantee can be captured using a simulator of the adversary view. For example, during a protocol Π that operates on an input x and an input y, the view $VIEW^\Pi$ (x, y) of the party providing the input x includes the input x, the outcome of the party's coin tosses and the messages received by the party during the execution of the protocol. In view of this, the following example definition can be provided:

Definition 1: The protocol Π that computes f(x, y) is secure in the semi-honest model, if for each party there exists a polynomial-time simulator S given the party's input and output is computationally indistinguishable from the party's view $VIEW^\Pi$ (x, y), as depicted in the following example relationship:

$$S(x, f(x,y)) = VIEW^\Pi(x,y)$$

In some examples, functions that are implemented in a garbled circuit protocol (e.g., Yao's garbled circuit protocol) using a compiler (e.g., the FairPlay compiler) are always secure in the semi-honest model. In some implementations, the optimizer can be assumed to preserve this security guarantee. In accordance with implementations of the present disclosure, rewriting rules, discussed in further detail herein, also assume the semi-honest model, but do not actually emit a protocol. This protocol is compiled by the optimizer, such that if it preserves semi-honest security, then the optimizations provided in accordance with implementations of the present disclosure also preserve semi-honest security. In some examples, transformations discussed herein are performed on the intermediate code of secure computation protocol.

As discussed herein, implementations of the present disclosure provide rewriting rules for rewriting program code. In some implementations, a language for expressions can be considered and can include the following example grammar:

```
    expr    := bracker|expon|multi|add|compare|simple
    bracket := (expr)
    expon   := exprΛ 1/?number
    multi   := expr· |/expr
    add     := expr+ | − expr
    compare := expr< | <= | == | != | > | >= expr
    simple  := −?var| number
    var     := a|b| ...
    number  := 0|1|2| ...
```

In some examples, and for simplicity, only fixed-length (e.g., 32=bit), signed fixed-point numbers considered for operands. In some examples, fixed-point numbers are provided as scaled integers where a fixed number of bits is reserved for decimal digits. Such scaled integers can effectively implement division or roots and can be efficiently implemented in secure computation. In some examples, each arithmetic operand implements semantics on these numbers. In some examples, comparison operations return either 0 for false or 1 for true.

In accordance with implementations of the present disclosure, an expression can be represented in an abstract syntax tree. In some examples, nodes of the abstract syntax tree are provided as the operators (e.g., +, ·, Λ, etc.) and the leaves are provided as simple expressions (e.g., numbers and variables). In some examples, the root of the tree is the last operator to be evaluated. Implementations of the present disclosure use the same operator precedence rules as standard programming languages (e.g., C, Java), as indicated by the order of grammar expression. In some examples, bracket expressions are resolved into a position in the abstract syntax tree. For purposes of illustration, the example expression 2+(3·4) has an abstract syntax tree with a root operator plus (+) whereas the example expression (2+3)·4 has an abstract syntax tree with a root operator multiply (·).

In some implementations, leaves are assigned labels indicating their origin (e.g., variables input by Alice are assigned label A and variables input by Bob are assigned label B, as discussed above). In some examples, constants (numbers) are assigned a common label, because they are known to both parties (e.g., the label AB, because constants are known to both Alice and Bob). In some examples, the common label is also used for public input variables (e.g., variables that are also known to both parties). In some examples, intermediate values are secret and, consequently, carry no label.

As introduced above, forward inference is straight-forward. In the abstract syntax tree, there are no intermediate values. Consequently, nodes of the abstract syntax tree can be assigned labels. For forward inference, a parent node can be assigned the intersection of labels of its children nodes.

As introduced above, backward inference can be less straight-forward. In some examples, a simplified version of backward inference can be provided. The resulting rewritten expression can then be analyzed to further optimize performance. Implementations of backward inference of the present disclosure can be referred to as result pruning. In some examples, it can be assumed that the final expression result is revealed to both parties as an output of the secure computation. Consequently, each operation at the root of the tree with an operand known to both parties can be pruned. If such an operation is encountered, the operation can be pruned from the abstract syntax tree.

Optimization is performed, such that a label at a node indicates that the respective intermediate value is known to a party and can be computed locally at that party. Nodes having no labels are to be computed using a secure computation protocol.

Figure 2:
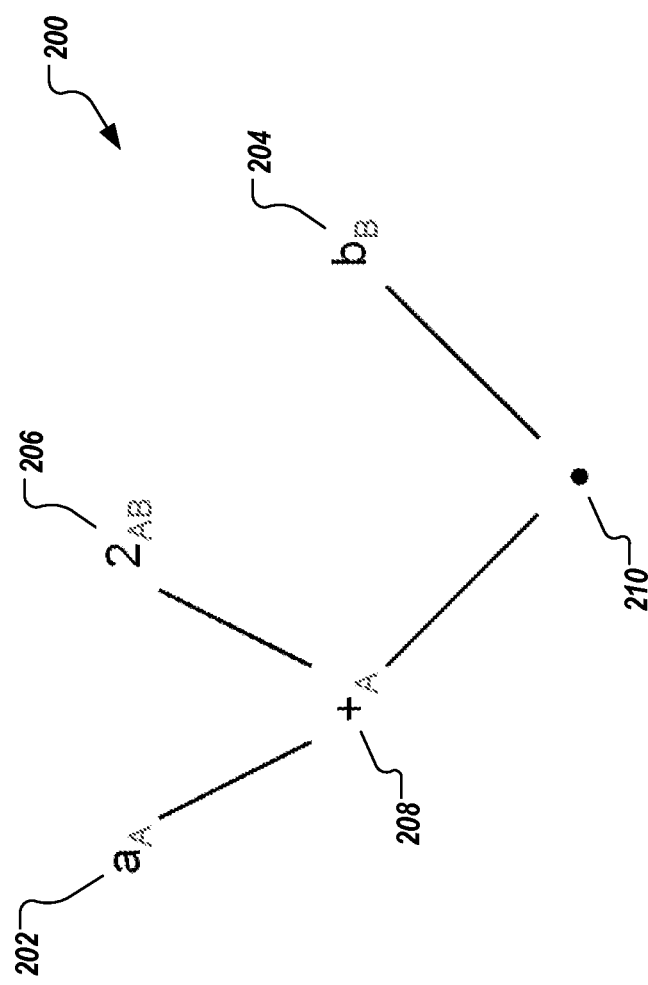
FIG. 2 depicts an example abstract syntax tree for an example expression.

FIG. 2 depicts an example abstract syntax tree 200 for an example expression. In the depicted example, the example expression includes (a+2)·b, where Alice provides input 202 (a) and Bob provides input 204 (b). In accordance with the above discussion, the input 202 include the label A and the input 204 includes the label B. The example expression includes a constant 206 having the label AB, and an operand 208 (+) having the label A. In accordance with the discussion above, the operand 208 includes the label A in view of the precedence of order of operations. The example expression further includes an operand 210, which includes no label.

Implementations of the present disclosure provide rewriting rules to account for associative and commutative laws (e.g., an associative law rewriting rule, a commutative law rewriting rule). For example, for an operator ⊕, the associative law holds if and only if:

$$a \oplus (b \oplus c) = (a \oplus b) \oplus c$$

Further, the commutative law holds if and only if:

$$a \oplus b = b \oplus a$$

For example, both the associative and commutative laws hold for the plus operator (+) and the multiply operator (·).

In accordance with implementations of the present disclosure, the minus operator (−) and the divide operator (/) can be rewritten for labeled, second operands into the plus operator (+) and the multiply operator (·), respectively. In the example expression a⊕b, the second operand is b. An operand is labeled, if it carries a label (e.g., A, B or AB). In view of this, an operand can be rewritten with its inverse in the operation (e.g., −b, 1/b). Because inversion is an operation using a neutral element (a constant), which is labeled for all parties (e.g., AB) and the operand, the inversion operator inherits the same label as the second operand. In this manner, a labeled operand can be rewritten with a labeled operation, and the operator of the expression can be rewritten to either the plus operator (+) or the multiply operator (·), respectively.

In some implementations, operators for which both the associative and commutative laws hold can be processed in a plurality of steps. Example steps can include merging and sorting. In merging, adjacent nodes in the abstract syntax tree are merged into a combined node with three or more operands. In view of the associative law, the expression result remains unchanged. In sorting, each child node is sorted according to its label in the following example order of labels: AB, A, B and no label. In view of the commutative law, the result of the expression remains unchanged.

FIGS. 3A and 3B depict example applications of an example associative law rewriting rule and an example commutative law rewriting rule, respectively. FIG. 3A depicts an example application of the associative and commutative laws discussed above. FIG. 3B depicts an example output of merged and sorted multi-operand operators. In the depicted example, a secure computation protocol is provided through the creation of operands in sequential order of labels. Based on the example order of labels provided above, public operands (label AB) a first created, operands associated with Alice (label A) are next created, operands associated with Bob (label B) are next created, operands not associated with a label are last created. Operators with different labels are added based on the example order of labels. In this manner, it can be ensured that the maximum number of operators inherit the labels of the operands. The only remaining operators in the secure computation are the operators that have no label. All other operations are performed locally at one party. In the example of FIG. 3B, Alice can locally compute the sum of the operators a and c, Bob can locally compute the sum of the operators b and d, and the secure computation protocol can compute the sum of Alice's result and Bob's result.

Implementations of the present disclosure provide a rewriting rule to account for the distributive law (e.g., a distributive law rewriting rule). For example, for a pair of operators (⊕, ⊙), the distributive law holds if and only if:

$$(a \oplus b) \odot (a \oplus c) = a \odot (b \oplus c)$$

The distributive law holds for the pairs of operators (+, −) and (·, /), respectively.

In some examples, a straight-forward way to apply the distributive law is to reduce the number of operations in cases including common sub-expressions. In some examples, common sub-expression elimination (CSE) is not superseded. On the one hand, CSE identifies and optimizes common sub-expressions even in remote parts of the program or protocol, whereas the rewriting rule of the present disclosure uses local operands. On the other hand, the rewriting rule of the present disclosure actually changes the order of operator evaluation, thereby eliminating any need for temporary storage.

In an illustrative example, e, f, and g can be provided as sub-expressions with arbitrary labels, and L can be an arbitrary—potentially empty—security label. The symbol "−" can indicate an empty label, and, if a sub-expression or operator has no label, the sub-expression or operator can carry any label. Continuing with the example, $e_L$ can be an expression with the label L and $\oplus_L$ can be an operator with the label L. In some examples, the following example expression:

$$(e_L \odot f) \oplus_- (e_L \odot_- g)$$

can be rewritten to provide the following example rewritten expression:

$$e_L \odot_- (f \oplus g)$$

Figure 4:
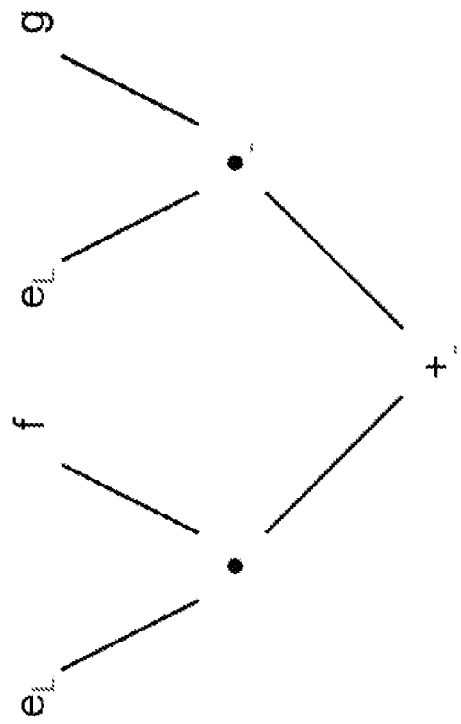
FIG. 4 depicts an example application of an example distributive law rewriting rule.
Figure 4:
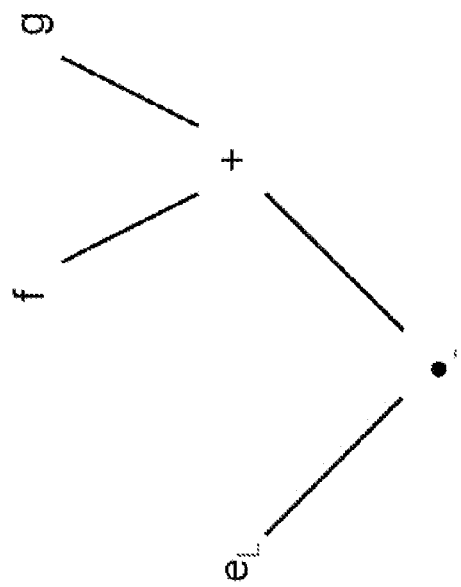

In this example, at least one operator (e.g., ⊙) must not carry a label. In this manner, it can be ensured that the number of operations in the secure computation decreases. A plurality of analogous rewriting rules can be provided for every position pair of the sub-expression $e_L$ and every combination of un-labeled operators in the initial expression. FIG. 4 depicts an example application an example distributive law rewriting rule.

In some implementations, common sub-expressions can be created using a combination of rewriting rules. In some examples, this can be useful in combination with one or more other rewriting rules discussed herein (e.g., the rewriting rules based on the associative and commutative laws). As an illustrative example, L' can be provided as a non-empty label, such that L and L' have at least one party in common (i.e., L∩L'≠0). Continuing with the example, $f^{-1}$ can be the inverse of a sub-expression according to an operator ⊙. In some examples, the following example expression:

$$e_L \oplus\_(f_{L'} \odot\_g)$$

can be rewritten to provide the following example rewritten expression:

$$(e_L \odot f_{L'}^{-1}) \odot f_{L'} \otimes\_(f_L \oplus g)$$

In some examples, in a second step, the above forward rewriting rule for the distributive law can be applied to provide:

$$f_{L'} \odot\_((e_L \odot f_{L'}^{-1}) \oplus g)$$

Figure 5:
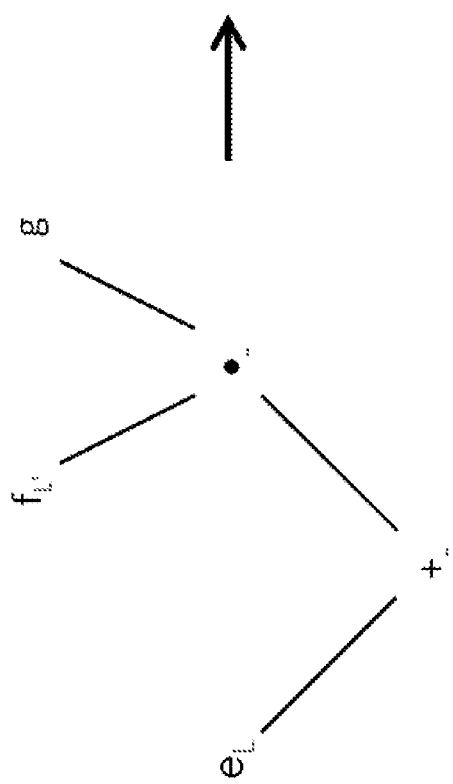
FIG. 5 depicts an example common sub-expression creation based on a combination of rewriting rules.
Figure 5:
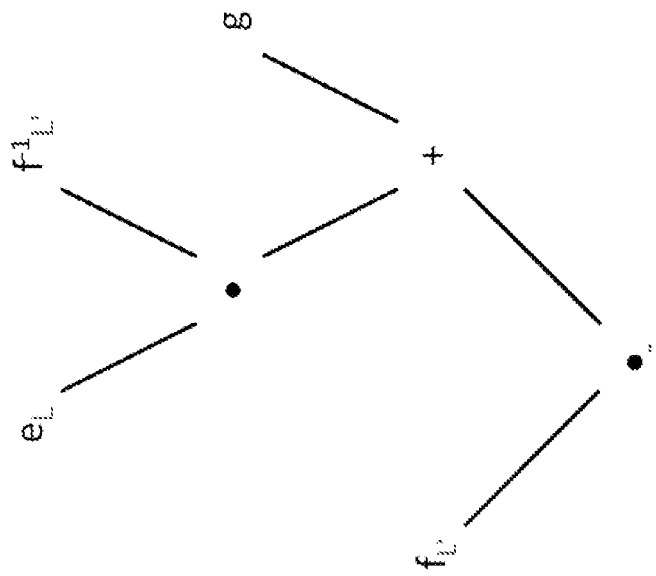

On the one hand, this rewriting rule does not increase performance by itself, but increase performance in combination with other rewriting rules. On the other hand, because the operator of the sub-expression $e_L \odot f_{L'}^{-1}$ carries a label, the operator does not (noticeably) decrease performance, but only changes the order of the operators. In this manner, potential application of further associative and commutative rewriting rules is provided. FIG. 5 depicts an example common sub-expression creation based on a combination of rewriting rules.

In some implementations, the distributive law can be applied in reverse (e.g., using a reverse distributive law rewriting rule). This may seem counter-intuitive, because reverse application of the distributive law increases the number of operations. However, by ensuring that the operand "distributed" is labeled, the number of operations to be performed in the secure computation protocol is at least likely to stay constant. Further, if this operand is labeled AB, as known to both parties or in combination with the rewriting rules for the associate and commutative laws, the number of operations in the secure computation protocol can be decreased.

In some examples, L can be a non-empty label, and the following example expression:

$$e_L \odot\_(f \oplus\_g)$$

can be rewritten to provide the following example rewritten expression:

$$(e_L \oplus f) \odot\_(e_L \oplus g)$$

Figure 6:
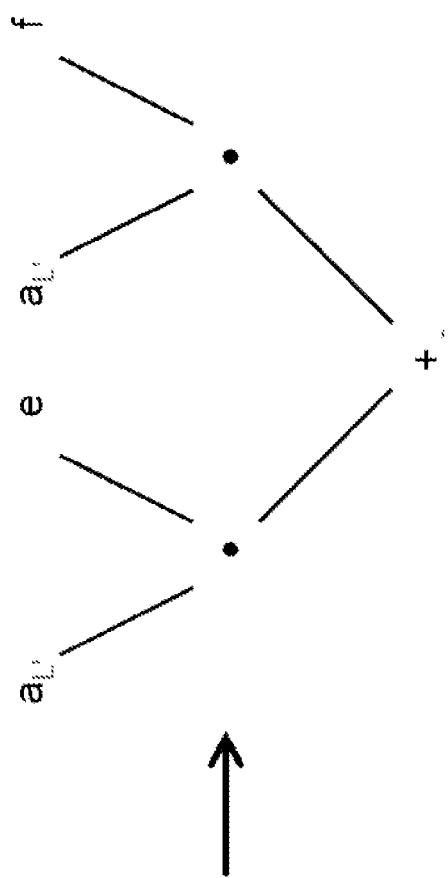
FIG. 6 depicts an example reverse application of the distributive law rewriting rule.
Figure 6:
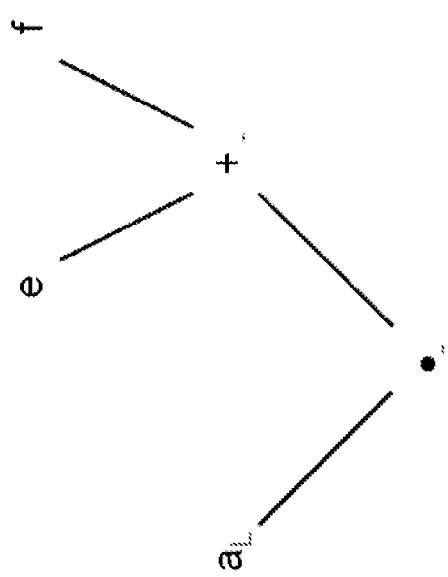

FIG. 6 depicts an example reverse application of the distributive law rewriting rule. As discussed above, it is not guaranteed that this rewriting rule decreases the number of operations in the secure computation protocol, but it does provide the possibility for a decreased number of operations. If this rewriting rule is effective in decreasing the number of operations in the secure computation protocol, then both operators ⊕ are labeled after rewriting—potentially after applying further rewriting rules. Further, and if this is the case, this rewriting rule will not be undone by the forward rewriting rule for the distributive law, because the forward rewriting rule requires at least one operator to be un-labeled, as discussed above.

Implementations of the present disclosure further provide a rewriting rule for inverse balancing (e.g., an inverse balancing rewriting rule). In an illustrative example, ⊗ can be provided as a comparison operator (e.g., <, >, =, etc.), and ⊕ and ⊖ can be provided as inverse operators, neither of which change the result of the comparison. In accordance with implementations of the present disclosure, the plus operator (+) and the minus operator (−) always build such a pair, whereas the multiply operator (·) and the divide operator (/) do not for inequality operators (e.g., because multiplication with a negative number inverts the result of the comparison). In view of the inverse balancing rule, the following example expression:

$$e \otimes\_f \oplus\_g$$

can be rewritten to provide:

$$e \ominus f \otimes\_g$$

Figure 7:
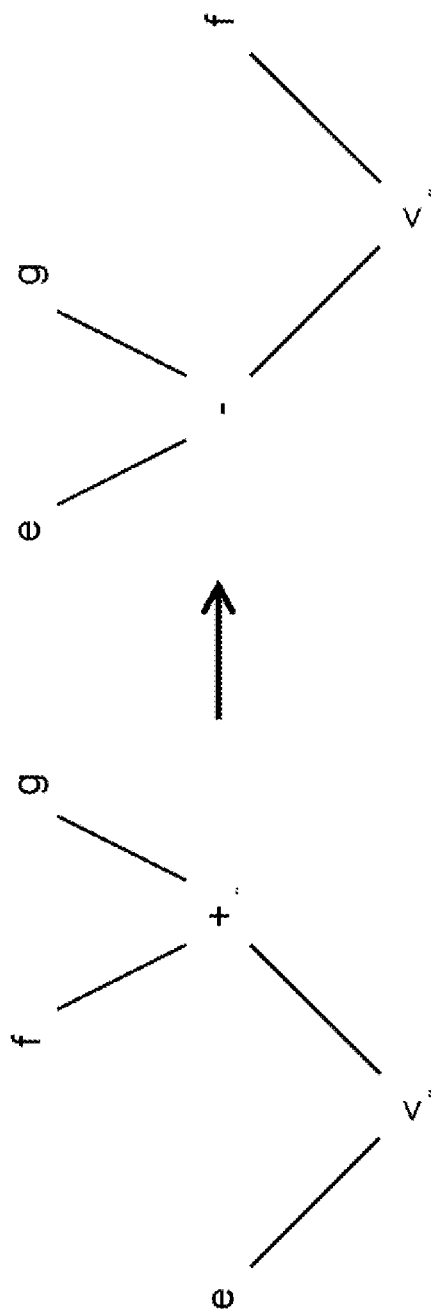
FIG. 7 depicts an example application of an example inverse balancing rewriting rule

In some examples, rewriting rules for the other operator ⊖, the other operand f and the other side of the comparison in the initial expression are maintained. FIG. 7 depicts an example application of an example inverse balancing rewriting rule.

Implementations of the present disclosure further apply a heuristic that results in secure computation protocols that are at least as efficient as the direct compilation of the initial expression. However, and scenario-dependent, some rewriting rules of the present disclosure could result in less secure computation protocols that are less efficient than before rewriting was applied. Consequently, implementations of the present disclosure provide for the careful selection of which rewriting rules to apply. In some implementations, selection of the rewriting rules is based on a cost function for operators.

Predicting the performance of a secure computation protocol can be a challenging task. However, at least one benefit of optimization in accordance with implementations of the present disclosure is to compute more operators locally. It is appreciated that, in some cases, the type of operators in the secure computation can be improved. Local computation is an order of magnitude faster than any secure computation protocol, regardless of whether using homomorphic encryption or garbled circuits. Accordingly, implementations of the present disclosure, it is provided that the performance of a garbled circuit secure computation protocol is linear in the number of gates of the operator, and a cost can be associated with each operator. For example, $\lambda$ can be provided as the bit-length of an operand, and the following example cost table can be provided for example operators:

TABLE 1

| Operator Costs based on Operand Bit-Length ($\lambda$) | |
| --- | --- |
| Operator | Cost |
| Labeled | 0 |
| Unlabeled | |
| Comparison | $\lambda$ |
| Addition | $\lambda$ |
| Multiplication | $\lambda^2$ |
| Exponentiation | $\lambda^3$ |

In some implementations, distinct cost functions can be used. Example cost functions can include an operator cost function (cost) and a tree cost function (tcost). In some examples, the operator cost function returns costs as provided in Table 1. In some examples, the tree cost function performs a preorder tree traversal and sums the cost of each encountered operator.

In some implementations, a search is performed to identify for performance-improving rewriting rules that can be applied. In some examples, the search is performed using a reverse breadth-first search. For example, it can be intuitively assumed that, in order to judge the effectiveness of a rewriting rule at the root of the tree, each sub-tree must be optimal. Accordingly, the search can be performed by visiting each sub-tree in order of increasing height. Each possible rewriting rule can be applied at the root, and an optimization can be performed on each sub-tree. Repeated, subsequent optimizations can be performed, because since a change in the abstract syntax tree (e.g., a change of the order of operators) may have enabled the applicability of additional rewriting rules in the sub-tree. In some examples, it can be provided that a rule that causes a cost-reduction cannot be undone by a subsequent rewriting rule. This can be true for the forward and backward rewriting rules for the distributive law due to their choice of labels on the operators.

An example algorithm, Algorithm 1 provided below, depicts example pseudo-code for a cost-driven heuristic in accordance with implementations of the present disclosure. In the example algorithm, a function "toptimize" performs an overall optimization, whereas a function "optimize" optimizes a sub-tree. In accordance with implementations of the present disclosure, only results of rewriting rules that decrease cost are kept. In this manner, the cost-driven heuristic deterministically does not increase cost. That is, the cost-drive heuristic either improves or maintains cost.

---
Algorithm 1: Cost-driven Heuristic
---
```
procedure toptimize(root)
    for 1 ≤ i ≤ height(root) do
        for all t| height(t) = i do
            optimize(t)
        end for
    end for
end procedure
procedure optimize(node)
    for all r do
        if matches(r, node) then
            new ← copy(node)
            apply(r, new)
            for all c|c ∈ children(new) do
                optimize(c);
            end for
            if tcost(new) < tcost(node) then
                node ← new
            end if
        end if
    end for
end procedure
```
---

By way of example, n nodes can be provided in an abstract syntax tree and a height of the abstract syntax tree can be provided as $H_n$. In some examples, each node can be visited at most $H_n$ times. Because $H_n$ can be equal to $O(n)$, the worst-case complexity of the cost-drive heuristic is $O(n^2)$. In one example, an expected height of a uniformly randomly chosen abstract syntax tree can be provided as $O(\log n)$ (i.e., $H_n = O(\log n)$). Consequently, the expected complexity of the cost-driven heuristic can be provided as $O(n \log n)$.

Implementations of the present disclosure can be illustrated by way of examples. In some examples, optimal performance cannot be expected to be achieved in every case. However, the cost-driven heuristic of the present disclosure is not expected to decrease performance. The effectiveness of implementations of the present disclosure can be highlighted with reference to the following examples.

One example includes statistics. Statistics computation is provided in more detail in the example above (e.g., the program from Listing 1.1). In this example, loops are unrolled, because they have a fixed number of iterations, an abstract syntax tree of expressions is built for each output, and the cost-driven heuristic is applied. First, the addition operators are merged and sorted into one multi-operand addition operator using the rewriting rules for the associative and commutative laws. The divisions by 2n and 2n−1, respectively, are pruned using result pruning. No additional rewriting rules result in further cost reductions. The generated intermediate code corresponds to the intermediate code of the rewritten program in Listing 1.2, above.

Another example includes computation of a joint economic lot size (JELS). In some examples, JELS is a two-party supply chain optimization. In this example, Alice supplies inputs $f_A$, $h_A$ and c, and Bob supplies inputs $f_B$ and $h_B$. An input d can be provided as a public input known to both Alice and Bob. The following example expression is computed securely and is output:

$$q = \sqrt{2 \cdot d \cdot \frac{f_A + f_B}{d \cdot \frac{h_A}{c} + h_B}}$$

In accordance with implementations of the present disclosure, an abstract syntax tree can be built for the example expression. The backward rewriting rule for the distributive law is applied to the denominator to reduce the number of operations in the secure computation by a multiplication, because d is a public variable. This example underpins the utility of the backward rewriting rule. The multiplication by 2d and square root are pruned using results pruning and the term $$d \cdot \frac{h_A}{c}$$

is labeled using the forward inference algorithm. The rewritten expression in the optimized secure computation is provided as:

$$q' = \frac{q^2}{2 \cdot d} = \frac{f_A + f_B}{a + b}$$

where $a = \frac{d \cdot h_A}{d}$ and $b = d \cdot h_B$.

In another example, implementations of the present disclosure can be used for XML transformation. Secure protocols for providing XML transformation can implement basic string processing operations, such as concatenation, sub-string and find. The secure computation protocols can be composed of several cryptographic techniques, such as secret sharing, homomorphic encryption, garbled circuits, and oblivious transfer. In an example secure computation protocol, a sub-step can be provided, in which a string length l is compared to a constant. The string length can be additively secret shared. For example, Alice can have $l_A$ and Bob can have $l_B$ such that $l = l_A + l_B$ (mod m) where the modulus m is public. The following example expression can be evaluated using garbled circuits:

$$l_A + l_B < m$$

In accordance with the present disclosure, the inverse balancing rule can be applied to provide the following example rewritten expression:

$$l_A < m - l_B$$

The rewritten expression saves a secure addition computation.

Figure 8:
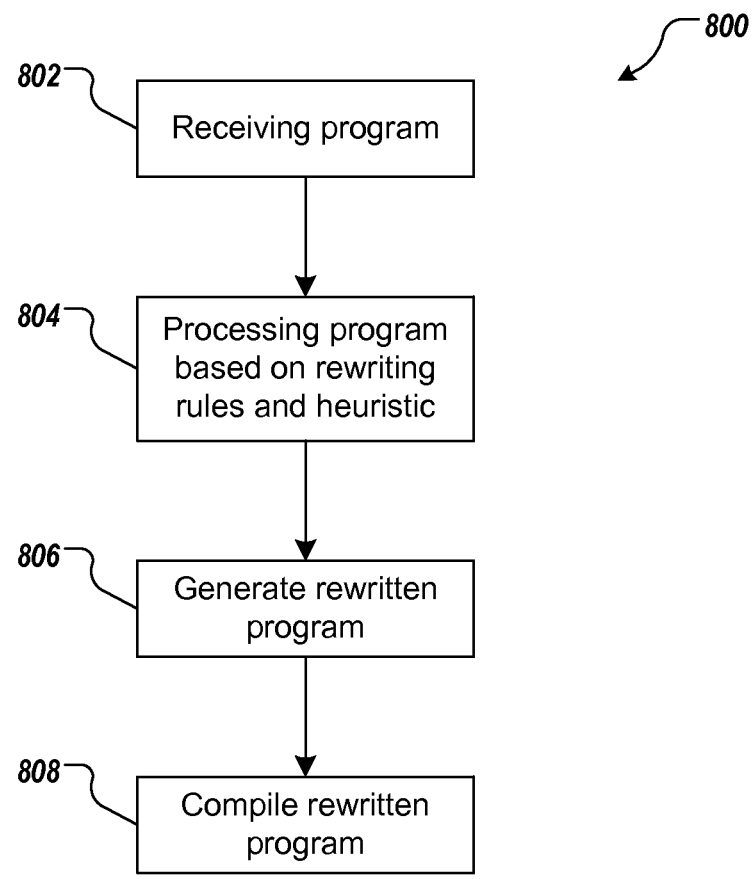
FIG. 8 is a flowchart illustrating an example process that can be executed to automatically provide an optimized secure computation protocol.

FIG. 8 is a flowchart illustrating an example process 800 that can be executed to automatically provide an optimized secure computation protocol. In some examples, the process 800 can be provided by one or more computer-executable programs that are executed using one or more computing devices.

A program is received (802). In some examples, the program is human-readable and includes one or more expressions to provide secure computation based on inputs provided by two or more parties. In some examples, the program provides a secure computation protocol including at least one calculation that is performed on behalf of the two or more parties. The program is processed based on the one or more rewriting rules and a cost-driven heuristic (804). For example, and as discussed herein, expressions of the program can be provided in an abstract syntax tree, to which one or more rewriting rules can be applied based on the cost-drive heuristic. A rewritten program is generated (806). For example, the rewritten program is automatically generated. In some examples, automatic generation includes the absence of user input to process the program based on the one or more rewriting rules and the cost-driven heuristic to generate the rewritten program. In some examples, the rewritten program includes a structure that enables localization of one or more calculations and provides an optimized secure computation protocol that localizes at least one calculation to be performed by at least one of the two or more parties. The rewritten program is compiled to generate a computer-executable program.

Figure 9:
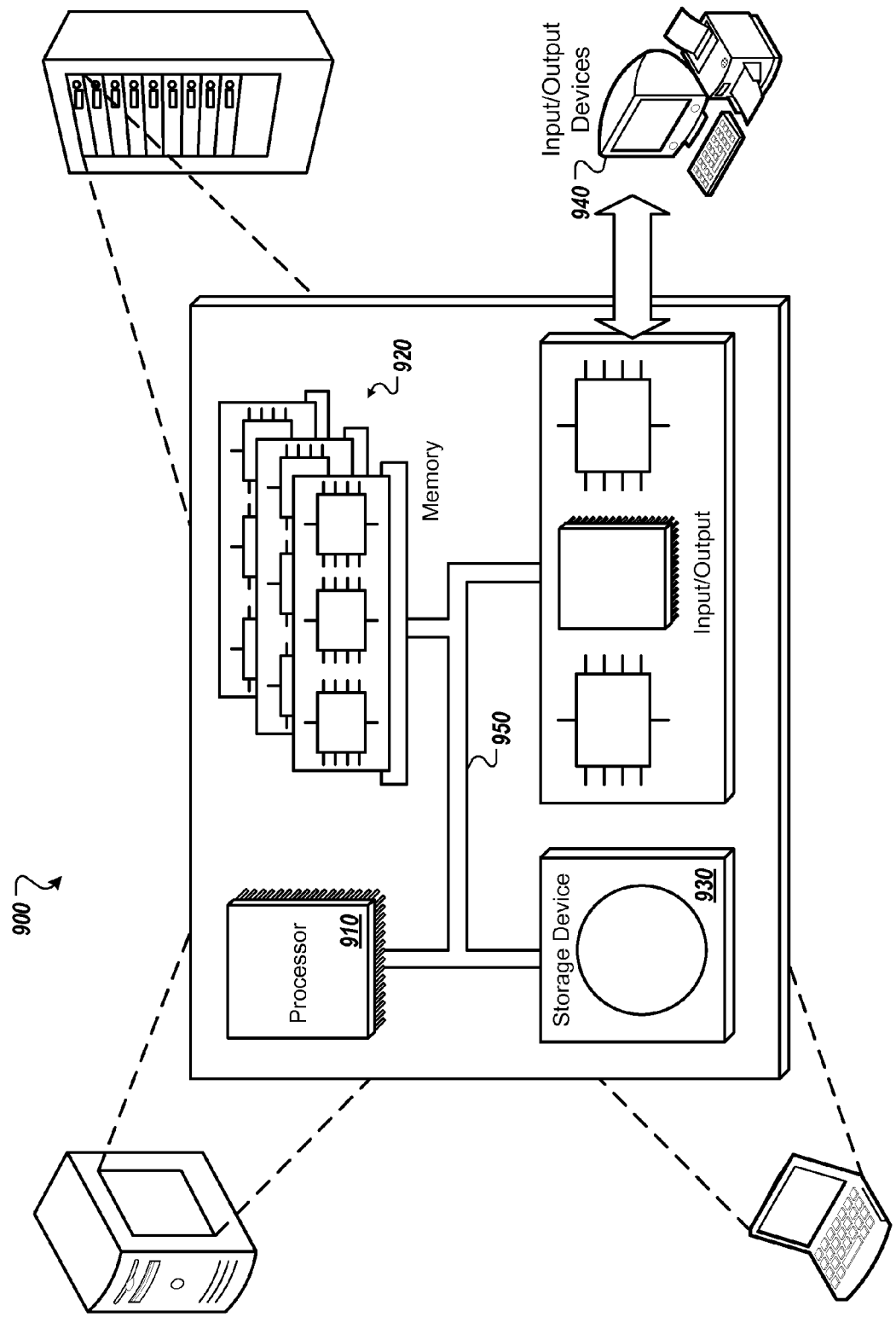
FIG. 9 is a schematic illustration of example computer systems that can be used to execute implementations of the present disclosure.

Referring now to FIG. 9, a schematic diagram of an example computing system 900 is provided. The system 900 can be used for the operations described in association with the implementations described herein. For example, the system 900 may be included in any or all of the server components discussed herein. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit. The storage device 930 is capable of providing mass storage for the system 900. In one implementation, the storage device 930 is a computer-readable medium. In various different implementations, the storage device 930 may be a floppy disk device, a hard disk device, an optical disk device, or a tape device. The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing secure, multi-party computation, the method being executed using one or more processors and comprising:
receiving, by the one or more processors, a program, the program being human-readable and providing a secure computation protocol comprising at least one calculation that is performed for two or more parties, the program comprising one or more expressions that provide secure computation based on inputs provided by the two or more parties;
processing, by the one or more processors, the program and one or more rewriting rules in view of a cost-driven heuristic by determining a plurality of operator cost functions based on operand bit-length and a tree cost function that performs a preorder tree traversal and sums the plurality of operator cost functions to automatically generate a rewritten program by representing an expression of the program as an abstract syntax tree that reduces a complexity of the secure computation protocol and optimizes a performance of the program, the rewritten program comprising_localization of one or more calculations by applying one or more operators to values within sets of the two or more parties and providing an optimized secure computation protocol that localizes the at least one calculation, such that the at least one calculation is to be performed by at least one of the two or more parties;
compiling, by the one or more processors, the rewritten program to generate a computer-executable program; and
providing the secure, multi-party computation by executing the computer-executable program.

2. The method of claim 1, wherein, the abstract syntax tree comprises nodes representing the one or more operators of the expression and leaves representing simple expressions of the expression, a root node of the abstract syntax tree comprising a final operator that is to be evaluated based on the expression.

3. The method of claim 2, wherein the abstract syntax tree is provided based on applying operator precedence rules to the expression.

4. The method of claim 2, wherein processing the program and one or more rewriting rules further comprises:
assigning labels to one or more leaves of the abstract syntax tree; and
assigning labels to one or more nodes of the abstract syntax tree; and
each label reflecting an origin that comprises at least one or the two or more parties.

5. The method of claim 4, wherein assigning labels comprises applying one or more inference rules.

6. The method of claim 4, wherein a non-labeled leaf comprises a simple expression having a value that is to remain unknown to the two or more parties.

7. The method of claim 4, wherein at least one parent node is assigned a label comprising an intersection of labels of children nodes.

8. The method of claim 2, wherein processing the program and one or more rewriting rules comprises rewriting the abstract syntax tree based on the one or more rewriting rules to provide a rewritten abstract syntax tree, the rewritten abstract syntax tree representing a rewritten expression based on the expression.

9. The method of claim 1, wherein the one or more rewriting rules comprise at least one rewriting rule from a group comprising: an associative law rewriting rule, a commutative law rewriting rule, a distributive law rewriting rule, an inverse balancing rewriting rule.

10. The method of claim 1, wherein the cost-driven heuristic is applied to determine a cost of an expression and a cost of a rewritten expression, the rewritten expression being based on the expression.

11. The method of claim 10, wherein the rewritten expression replaces the expression when the cost of the expression is greater than the cost of the rewritten expression.

12. The method of claim 1, wherein the optimized secure computation protocol emulates a trusted party which receives the inputs from the two or more parties, computes a function, and privately provides a respective output to each party of the two or more parties.

13. The method of claim 1, wherein the program requires a number of cryptographic steps, and the rewritten program reduces the number of cryptographic steps.

14. A non-transitory computer-readable medium coupled to the one or more computers having instructions stored thereon which, when executed by the one or more computers, cause the one or more computers to perform operations to provide secure, multi-party computation, the operations comprising:
receiving a program, the program being human-readable and providing a secure computation protocol comprising at least one calculation that is performed for two or more parties, the program comprising one or more expressions that provide secure computation based on inputs provided by the two or more parties;
processing the program and one or more rewriting rules in view of a cost-driven heuristic by determining a plurality of operator cost functions based on operand bit-length and a tree cost function that performs a preorder tree traversal and sums the plurality of operator cost functions to automatically generate a rewritten program by representing an expression of the program as an abstract syntax tree that reduces a complexity of the secure computation protocol and optimizes a performance of the program, the rewritten program comprising_localization of one or more calculations by applying one or more operators to values within sets of the two or more parties and providing an optimized secure computation protocol that localizes the at least one calculation, such that the at least one calculation is to be performed by at least one of the two or more parties;
compiling the rewritten program to generate a computer-executable program; and
providing the secure, multi-party computation by executing the computer-executable program.

15. A system for providing secure, multi-party computation, the system comprising:
one or more computers; and
a computer-readable medium coupled to the one or more computers having instructions stored thereon which, when executed by the one or more computers, cause the one or more computers to perform operations comprising:
receiving a program, the program being human-readable and providing a secure computation protocol comprising at least one calculation that is performed for two or more parties, the program comprising one or more expressions that provide secure computation based on inputs provided by the two or more parties;

processing the program and one or more rewriting rules in view of a cost-driven heuristic by determining a plurality of operator cost functions based on operand bit-length and a tree cost function that performs a preorder tree traversal and sums the plurality of operator cost functions to automatically generate a rewritten program by representing an expression of the program as an abstract syntax tree that reduces a complexity of the secure computation protocol and optimizes a performance of the program, the rewritten program comprising_localization of one or more calculations by applying one or more operators to values within sets of the two or more parties and providing an optimized secure computation protocol that localizes the at least one calculation, such that the at least one calculation is to be performed by at least one of the two or more parties;

compiling the rewritten program to generate a computer-executable program; and providing the secure, multi-party computation by executing the computer-executable pro gram.

* * * * *